(12) United States Patent
Poon et al.

(10) Patent No.: US 6,522,440 B1
(45) Date of Patent: *Feb. 18, 2003

(54) INTER-SATELLITE OPTICAL LINK TRACK SENSOR

(75) Inventors: Chie W. Poon, Torrance, CA (US); Robert C. Carden, III, Orange, CA (US); Robert M. Englekirk, Pacific Palisades, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/301,494

(22) Filed: Apr. 28, 1999

(51) Int. Cl.[7] .......................... H04B 10/06; H04B 10/00
(52) U.S. Cl. ...................... 359/189; 359/154; 359/172
(58) Field of Search .................. 359/154, 159, 359/172, 193, 189

(56) References Cited

U.S. PATENT DOCUMENTS

| 3,504,182 | A |   | 3/1970  | Pizzurro et al. | 359/114 |
|-----------|---|---|---------|-----------------|---------|
| 3,511,998 | A |   | 5/1970  | Smokler         | 359/171 |
| 4,017,146 | A |   | 4/1977  | Lichtman        | 350/7   |
| 4,982,445 | A |   | 1/1991  | Grant et al.    | 455/606 |
| 5,030,004 | A | * | 7/1991  | Grant et al.    | 356/153 |
| 5,039,194 | A | * | 8/1991  | Block et al.    | 350/96.1 |
| 5,060,304 | A |   | 10/1991 | Solinsky        | 359/152 |
| 5,062,150 | A |   | 10/1991 | Swanson et al.  | 359/152 |
| 5,282,073 | A |   | 1/1994  | Defour et al.   | 359/159 |
| 5,390,040 | A |   | 2/1995  | Mayeux          | 359/152 |
| 5,475,520 | A |   | 12/1995 | Wissinger       | 359/172 |
| 5,486,690 | A |   | 1/1996  | Ake             | 250/206.1 |
| 5,592,320 | A |   | 1/1997  | Wissinger       | 359/159 |
| 5,710,652 | A |   | 1/1998  | Bloom et al.    | 359/152 |
| 5,953,146 | A | * | 9/1999  | Shelby          | 359/159 |
| 6,122,084 | A | * | 9/2000  | Britz et al.    | 359/172 |
| 6,178,024 | B1 | * | 1/2001  | Degura          | 359/159 |
| 6,268,944 | B1 | * | 7/2001  | Szapiel         | 359/159 |
| 6,271,953 | B1 | * | 8/2001  | Dishman et al.  | 359/172 |
| 6,297,897 | B1 | * | 10/2001 | Czichy et al.   | 359/172 |
| 6,304,354 | B2 | * | 10/2001 | Carlson         | 359/172 |
| 6,323,980 | B1 | * | 11/2001 | Bloom           | 359/159 |

FOREIGN PATENT DOCUMENTS

| EP | 0 482 472 A2 | 10/1991 |
| EP | 0 504 022 A1 | 3/1992  |
| EP | 0 847 149 A1 | 8/1997  |
| EP | 0 863 627 A1 | 10/1997 |
| EP | 0 876 013 A1 | 12/1997 |
| EP | 0 883 253 A1 | 6/1998  |
| EP | 0 887 656 A1 | 9/1998  |

* cited by examiner

*Primary Examiner*—Leslie Pascal
*Assistant Examiner*—Dalzid Singh
(74) *Attorney, Agent, or Firm*—McAndrews, Held & Malloy, Ltd.

(57) ABSTRACT

The present invention provides a tracking sensor and system to maintain the alignment of an optical communication beam between two terminals. A four-quadrant InGaAs photodetector receives the optical beam. Each quadrant of the photodetector transmits the signal to channel circuitry. The channel circuitry synchronously demodulated the signal to calculate received power. The received power for each signal is supplied to an up/down adder, a left/right adder and a total power received adder which provide the relative powers received in the upper half with respect to the lower half and in the left half with respect to the right half as well as the total power received. The fine track mechanism of the receiving terminal is adjusted to equalize the received power for each half. When each half is receiving equal power, the optical beam is centered. The photodetector, channel circuitry, and adders are contained in a single, hermetically sealed package with an optical window through which the optical signal passes.

33 Claims, 6 Drawing Sheets

INTER-SATELLITE OPTICAL LINK TRACK SENSOR

BACKGROUND OF THE INVENTION

The present invention generally relates to a track sensor for tracking an optical link between satellites. More particularly, the present invention relates to a track sensor including a multi-channel photodetector for use in tracking an optical link between terminals based on the received power per channel from a communication optical beam.

One of the difficulties in long distance optical communication (such as laser communication) is maintaining an established optical communication link between transmitting and receiving communication terminals. The optical communication link may be negatively affected by such factors as the relative positional changes of the terminals, jitter in the terminals, or pointing error. The receiving and transmitting terminals may be either satellite or ground stations.

To maintain communication, the pointing of the optical beams must be adjusted to reflect the movement of the receiving terminal with respect to the transmitting terminal. This may be done by employing an optical sensor to detect changes in the optical beam pointing and then compensate for these changes by, for example, re-orienting the beam steering using mechanism driven optical elements Prior art systems employed devices such as additional optical beacons directed to specific track sensors on the receiving satellite to maintain correct communication beam pointing. Multiple optical beacons increase cost in terms of both the size and weight of the satellite and the power consumption of the beacon. Other systems relied on hyper-accurate positioning, which may not be achievable when the separation between terminals is large and may be easily disrupted by spacecraft jitters.

Thus, a need has long existed for a tracking system and sensor that minimizes power consumption and additional weight and size while providing reliable, fault tolerant, and quickly achievable tracking of an optical communications beam.

SUMMARY OF THE INVENTION

One object of the present invention is provide an optical tracking sensor for use in an optical tracking system that eliminates additional laser beacon signals.

Another objective of the present invention is to minimize the cost, complexity, size, weight, and power consumption of the hardware used to provide the tracking system and sensor.

One or more of the foregoing objects are met in whole or in part by the inter-satellite optical link track sensor of the present invention. The present invention provides a tracking sensor and system to maintain the alignment of an optical communication beam between two terminals so that the two terminals may communicate.

The tracking sensor includes a multi-channel photodetector and channel circuitry including a synchronous demodulator and at least one adder. A received optical signal is converted to an electrical signal by the photodetector and supplied to channel circuitry. The channel circuitry determines the power of the received signal by synchronously demodulating the received signal. A signal representing the power of at least two channels is supplied to the at least one adder to sum the received power. The determination of the power received per channel allows the receiving terminal to calculate its pointing error.

These and other features of the present invention are discussed or apparent in the following detailed description of the preferred embodiments of the invention.

DETAILED DESCRIPTION OF THE PREFERRED EMBODIMENTS

Figure 1:
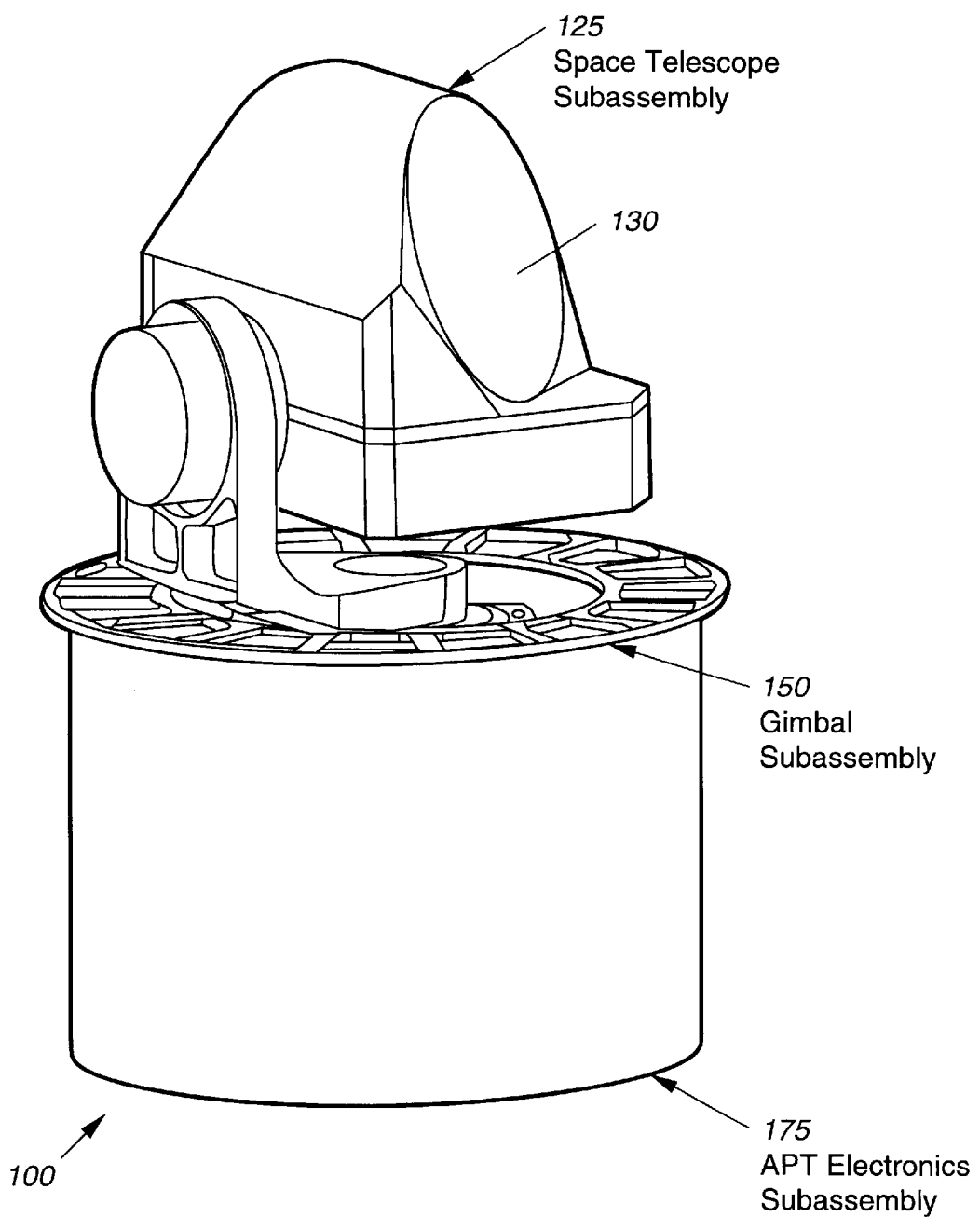
FIG. 1 illustrates the Gimballed Telescope Assembly (GTA) of the present invention.

FIG. 1 shows a Gimballed Telescope Assembly (GTA) 100 of the present invention. The GTA 100 includes a Space Telescope Subassembly (STS) 125, 1 Gimbal Subassembly 150, and an Acquisition Pointing and Tracking (APT) Electronics Subassembly 175. The preferred embodiment of the GTA includes a two-axis gimballed 15 cm diameter telescope and associated sensors, mechanisms, and control electronics required for acquisition, pointing and tracking.

The STS 125 contains the telescope and an optical bench holding the transmit, receive, acquisition, and tracking components. The gimbal subassembly 150 provides the required azimuth and elevation range of motion and tracking slew rate to the STS 125. The transmit and receive signals are carried to the STS 125 through the gimbal subassembly 150 on optical fibers. The APT electronics subassembly 175 provides acquisition/pointing/tracking control.

As will be explained in greater detail below, incident laser energy passes through the protective window 130 of the STS 125 to the interior of the STS 125 where it is received and processed. Additionally, the satellite upon which the GTA 100 is mounted may transmit laser energy through the protective window 130 of the STS 125. The protective window serves to isolate the interior of the STS 125 from the harsh space environment.

Figure 2:
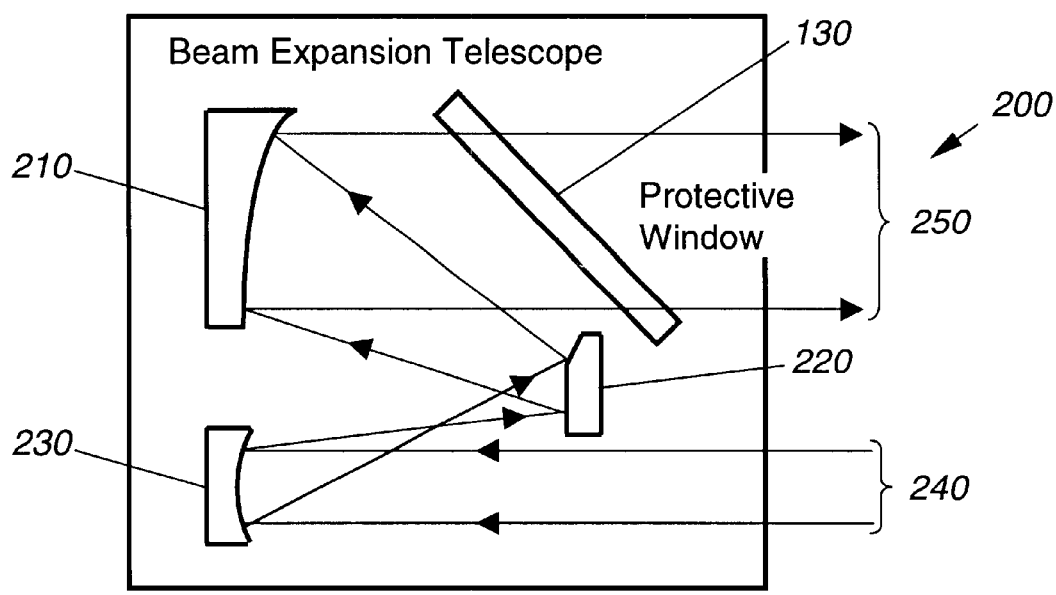
FIG. 2 illustrates the Beam Expansion Telescope (BET) of the Space Telescope Subassembly (STS).

The STS 150 is comprised of a Beam Expansion Telescope (BET) 200, and the associated transmit, receive, acquisition, and tracking components mounted on an optical bench. FIG. 2 illustrates the BET 200 of the STS 125. The BET includes a first mirror 210, a second mirror 220, and a third mirror 230. The three mirrors are positioned in a Three Mirror Anastigmat (TMA) configuration relative to each other and the incident laser energy.

In operation, the BET 200 expands the outgoing laser beam and collects the incoming light. The outgoing laser beam enters the BET 240 and is incident upon the third mirror 230. The path and orientation of the outgoing beam is shown by rays 240. The outgoing beam is reflected from the third mirror 230 and redirected to the second mirror 220. The second mirror 220 reflects the incident beam onto the first mirror 210. The first mirror 210 reflects the incident beam through the protective window 130 and into the space environment. The path of the laser beam as it exits the BET 200 through the protective window 130 of the STS 125 is indicated by rays 250. Because of the relative focal radii and optical properties of the mirrors (210–230) the outgoing beam is expanded to a desired size.

An incoming laser beam follows the same path as the outgoing laser beam, but in reverse. The incoming laser beam passes through the protective window 120 to the first mirror 210 where it is reflected to the second mirror 220 which reflects the incoming laser beam to the third mirror 230 which reflects the beam out of the BET 200.

The preferred embodiment of the BET 200 uses an all-reflective Three Mirror Anastigmat (TMA) with an on-axis magnification of 7.5 and an effective collection area of 177 cm$^2$. The optical components are preferably diamond-turned, enabling reliable low-cost volume fabrication and delivering superior wavefront quality. Additionally, the protective window 130 preferably has a coating that admits radiation only above 1500 nm and provides solar and contamination control.

Figure 3:
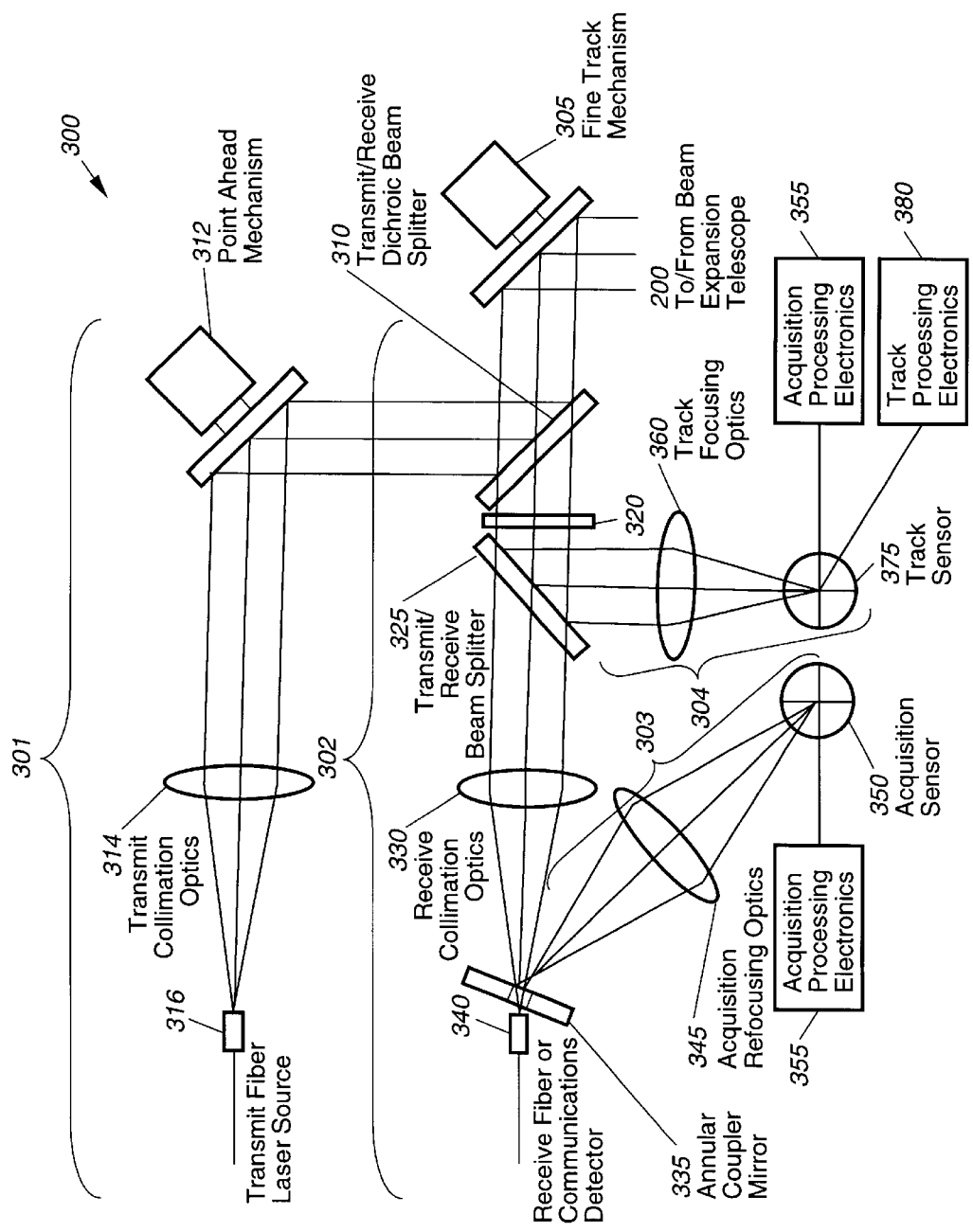
FIG. 3 illustrates the optical bench of the STS.

FIG. 3 shows the optical bench 300 of the STS 125. The optical bench 300 includes a Fine Track Mechanism (FTM) 305, a Transmit/Receive Dichroic Beam Splitter 310, transmit segment 301, a receive segment 302, an acquisition segment 303, a tracking segment 304. The transmit segment 301 includes a Point Ahead Mechanism (PAM) 312, Transmit Collimation Optics 314, and a transmit Fiber Laser Source 316. The receive segment 302 includes a Narrow Band Pass Filter (NBPF) 320, a Track/Receive Beam Splitter 325, Receive Collimation Optics 330, an Annular Coupler Mirror 335, and a Receive Fiber or Communications Detector 340. The acquisition segment 303 includes acquisition refocusing optics 345, acquisition sensor 350, and acquisition processing electronics 335. The tracking segment 304 includes track focusing optics 360, a track sensor 375, track processing electronics 380, and is connected to an acquisition processing electronic 355 similar to the acquisition processing electronic 355 in the acquisition processing segment 303.

In operation, received laser energy travels from the BET 200 of FIG. 2 to the FTM 305. The FTM 305 reflects the laser energy onto the dichroic beam splitter 310. The dichroic beam splitter 310 is substantially transparent to laser energy at the wavelength of the receive laser energy. Thus the received laser energy passes through the dichroic beam splitter 310 to the receive segment 302.

Transmitted laser energy travels from the transmit segment 301 to the dichroic beam splitter 310. The dichroic beam splitter 310 is reflective to laser energy at the wavelength of the transmitted laser energy. Thus, the transmitted laser energy is reflected from the dichroic beam splitter 310 to the FTM 305. The FTM 305 reflects the incident laser energy to the BET 200.

Both the received and transmitted laser energy thus occupy the same optical pathway from the dichroic beam splitter 310 to the FTM 305 and through the optics of the BET 200. The received and transmitted laser energy do not interfere with each other because they are at different wavelengths. Thus, both the received and transmitted laser energy may use the same optical pathway without interference and the dichroic beam splitter 310 may appear simultaneously reflective to the transmitted laser energy and substantially transparent to the received laser energy. Preferably, the FTM 305 is an electromagnetically driven, flexure-mounted mirror with integral angle sensing, providing 700 to 800 Hz bandwidth pointing control over +/−0.5 degree mechanical travel.

During operation of the transmit segment 301, the transmit fiber laser source 316 emits laser energy which passes through the transmit collimation optics 314 to the PAM 312. The PAM 312 reflects the laser energy to the dichroic beam splitter 310 where the laser energy is further reflected to the FTM 305 and then to the BET and eventually into the space environment. Both the PAM 312 and the FTM 305 may be mechanically gimbaled to provide steering of the laser energy. For fine steering and pattern steering, the PAM 312 is preferred.

Preferably, the PAM 312 is similar to the FTM 305 except for an increased field of regard to accommodate the scan angle acquisition. The scan angle required for acquisition is driven primarily by the 0.1 degree uncertainty factor in the spacecraft attitude. Preferably, the PAM 312 can be mechanically repositioned by +/−2.25 degrees to accommodate the scan angle for acquisition.

During operation of the receive segment 302, laser energy entering the BET 200 is reflected by the FTM 305 and passes through the dichroic beam splitter 310. The received laser energy then passes through the NBPF 320. The NBPF 320 is centered on the wavelength of the received laser energy and serves to reduce the level of non-signal optical noise entering from the external space environment. While the preferred embodiment of the protective window 130 of FIG. 1 preferably has a coating that admits radiation only above 1500 nm and provides solar and contamination control as noted above, the NBPF operating in conjunction with the protective window 130 may yield a more refined and band-centered filtering then the protective window 130 alone.

After passing through the NBPF 320, the laser energy impinges upon the track/receive beam splitter which redirects a portion of the, total laser energy into the tracking segment 304. The remainder of the total laser energy passes through receive collimation optics 330 and impinges upon the annular coupler mirror 335. The annular coupler mirror 335 is a reflective disk with a centered circular portion of the disk removed. Laser energy impinging on the annular coupler mirror 335 within the center circular portion passes through the plane of the mirror and impinges upon the receive fiber or communications detector 340. Laser energy impinging on the annular coupler mirror 335 outside of the center circular region is reflected into the acquisition segment 303.

Turning now to the acquisition segment 303, laser energy reflected from the annular coupler mirror 335 passes through the acquisition refocusing optics 345 and impinges upon the acquisition sensor 350. The acquisition sensor 350 transforms the laser energy impinging upon it to an electrical signal. The electrical signal generated by the acquisition sensor 350 is further processed in the acquisition processing electronics 355.

Turning now to the tracking segment 304, laser energy reflected from the track/receive beam splitter 325 passes through the track focusing optics 360 and impinges upon the tracking sensor 375. Like the acquisition sensor, the tracking sensor 375 transforms impinging laser energy to an electrical signal which is further processed in the track processing electronics 380. Additionally, the electrical signal may be passed to the acquisition processing electronics 355 for further processing.

Figure 4:
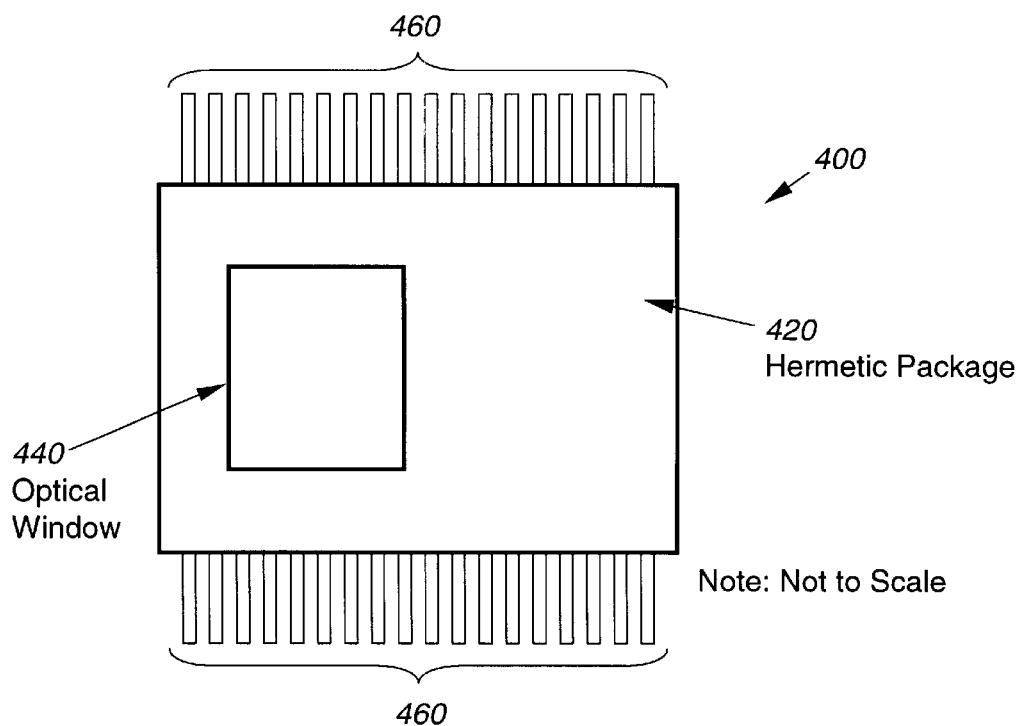
FIG. 4 is a representational drawing of the tracking sensor of the present invention.

FIG. 4 is a representational drawing 400 of a tracking sensor 375. The tracking sensor 375 is hermetically sealed inside a hermetic package 420. The hermetic package 420 includes an optical window 440 and a number of electrical leads 460. As a representational drawing, FIG. 4 is not to scale, nor are the relative sizes of the optical window 440, the hermetic package 420 and the electrical leads 460 constrained to be as they appear in FIG. 4. Nor is the number of leads of the essence. During operation, laser energy focused by the tracking focusing optics 360 of FIG. 3 focuses laser energy through the optical window 440 and onto an optical sensor as will be discussed below.

Figure 5:
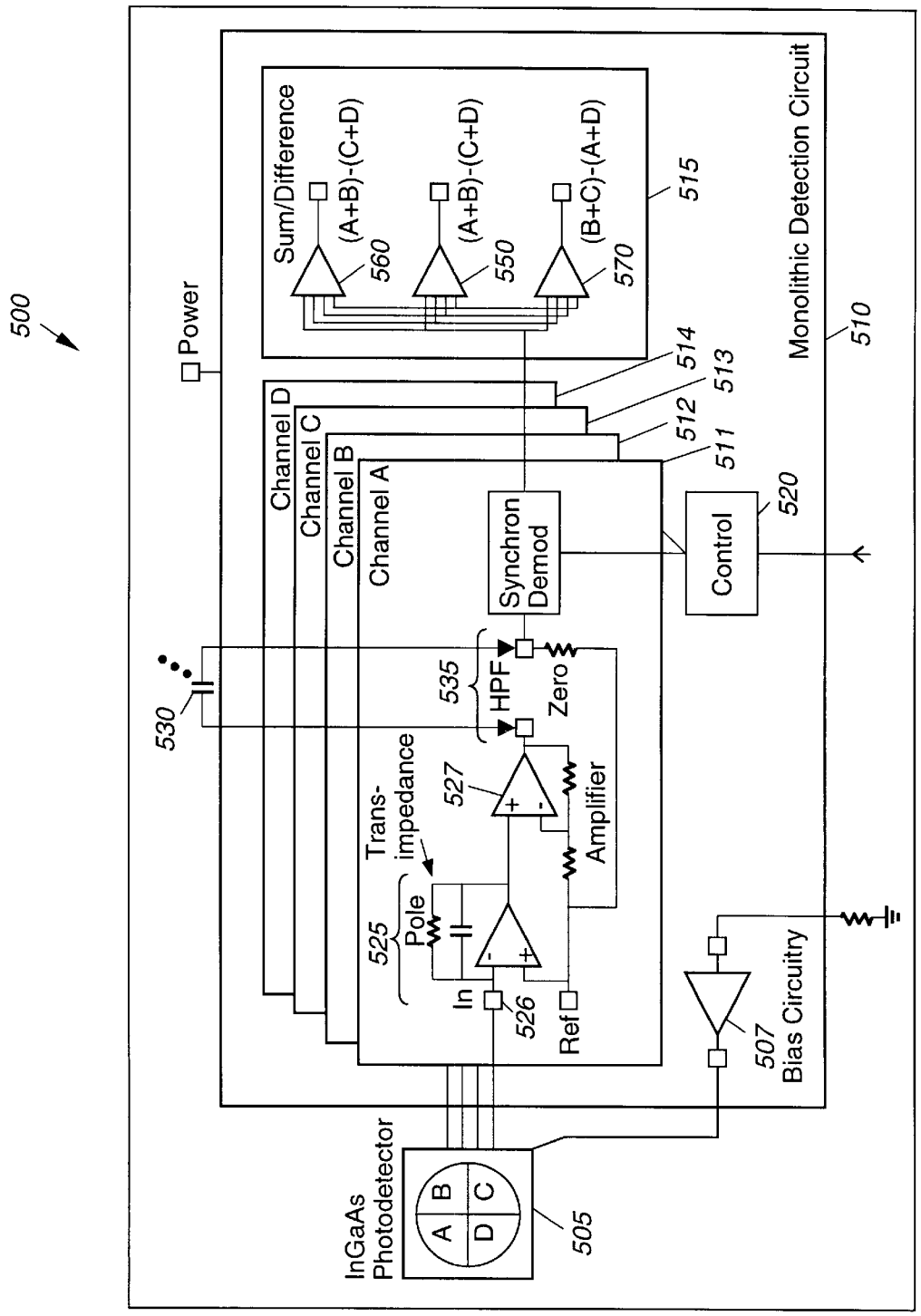
FIG. 5 illustrates a detailed schematic of a preferred embodiment of the track sensor.

A detailed schematic of a preferred embodiment of a tracking sensor 500 is shown in FIG. 5. The tracking sensor 500 includes an InGaAs photodetector 505 and a monolithic detection circuit 510 with four channels A–D 511–514. The monolithic detection circuit 510 also includes bias circuitry 507 for biasing the photodetector 505 and a control block 520. The monolithic detection circuit 510 also includes a sum/difference block 515.

Each channel A–D 511–514 of the monolithic detection circuit 510 includes an input 526, Low Pass Filter Trans-Impedance amplifier (TIA) 525, Amplifier 527, a High Pass Filter (HPF) 535 including an external capacitor 530, and a synchronous demodulator 540.

The photodetector 505 is preferably circular in aspect and partitioned into four contiguous quadrants A–D 505a–d as shown. Each of the quadrants A–D 505a–d is electrically connected to a single channel A–D 511–514. For example, quadrant A 505a is electrically connected to channel A 511. Each quadrant A–D 505a–d of the photodetector 505 responds to incident laser energy by transmitting an electrical signal to its respective channel 511–515. The strength of the signal sent from each quadrant A–D 505a–d of the photodetector 505 to its respective channel A–D 511–514 is proportional to the optical signal incident upon that quadrant. Bias circuitry 507 provides higher bandwidth performance to the photodetector 505.

Using channel A 511 as an example, the electrical signal, in the form of an electrical current, is transmitted from quadrant A 511 to the input 526 of channel A 511. The signal is then passed through the TIA 525 to convert it to a voltage signal and to remove any undesired high frequency response such as high frequency noise, for example. The signal is then amplified through the amplifier 527 and through the HPF 535 to remove DC component such as bias and offset any undesired low frequency response such as low frequency noise, for example. The HPF 535 requires a fairly large capacitance value which is provided by the external capacitor 530. The capacitor 530 is preferably external to the monolithic detection circuit 510 because its physical dimensions would reduce space efficiency if included directly in the monolithic detection circuit 510.

After passing through the HPF 535, the signal is passed to the synchronous demodulator 540. The synchronous demodulator determines the power received by the channel A 511 which is the power of the optical signal incident on quadrant A 505a of the photodetector 505.

The signal received by the synchronous demodulator is in digital format and each digital bit consists of high and low states corresponding to a binary system. The synchronous demodulator 540 determines the power of the channel by correlating the received states with either a high or low state and separately integrating the high and low states to determine the total power for that bit. The control block 520 provides clock information to the synchronous demodulator 540 so that the synchronous demodulator 540 integrates over the correct bit period. The output of the synchronous demodulator 540 is the summed power of the high and low states over a predetermined number of bits which is the total power for channel A 511 and for quadrant A 505a of the photodetector 505.

The total power for each channel is supplied to the sum/difference block 515. The sum/difference block contains three adders 550–570, a total power received adder 550, an up/down resolution adder 560 to determine the relative power in the upper two quadrants of the photodetector with respect to the lower two quadrants of the photodetector, and a left/right resolution adder 570 to determine relative power in the left two quadrants of the photodetector with respect to the right two quadrants of the photodetector. Each adder 550–570 is supplied with the total power from each of Channel A–D 511–514.

The total power received adder 550 sums the received power from each channel A–D 511–514. Thus, the output of the total power received adder 550 is the total power received by the photodetector 505. The up/down resolution adder 560 sums the received power from Channel A 511 and Channel B 512 and subtracts the received power from Channel C 513 and Channel D 514. Thus, the output of the up/down resolution adder 560 will be positive if more power is received in the upper half of the photodetector (Quadrants A and B) and negative if more power is received in the lowed half of the photodetector (Quadrants C and D). The left/right resolution adder 570 sums the received power from Channel B 512 and Channel C 513 and subtracts the received power from Channel A 511 and Channel D 514. Thus, the output of the left/right resolution adder 570 will be positive if more power is received in the right half of the photodetector (Quadrants B and C) and negative if more power is received in the left half of the photodetector (Quadrants A and D).

The outputs of the adders 550–570 are supplied to further processing circuitry (not shown) to determine the beam shot centroid position which controls the FTM 305. The processing circuitry (not shown) used the outputs of the three adders 550–570 to determine the positioning of the FTM 305 so as to equalize the received power with respect to each quadrant or center the beam on the photodetector 505. When the power received by each quadrant is equal, the received beam is exactly centered.

Figure 6:
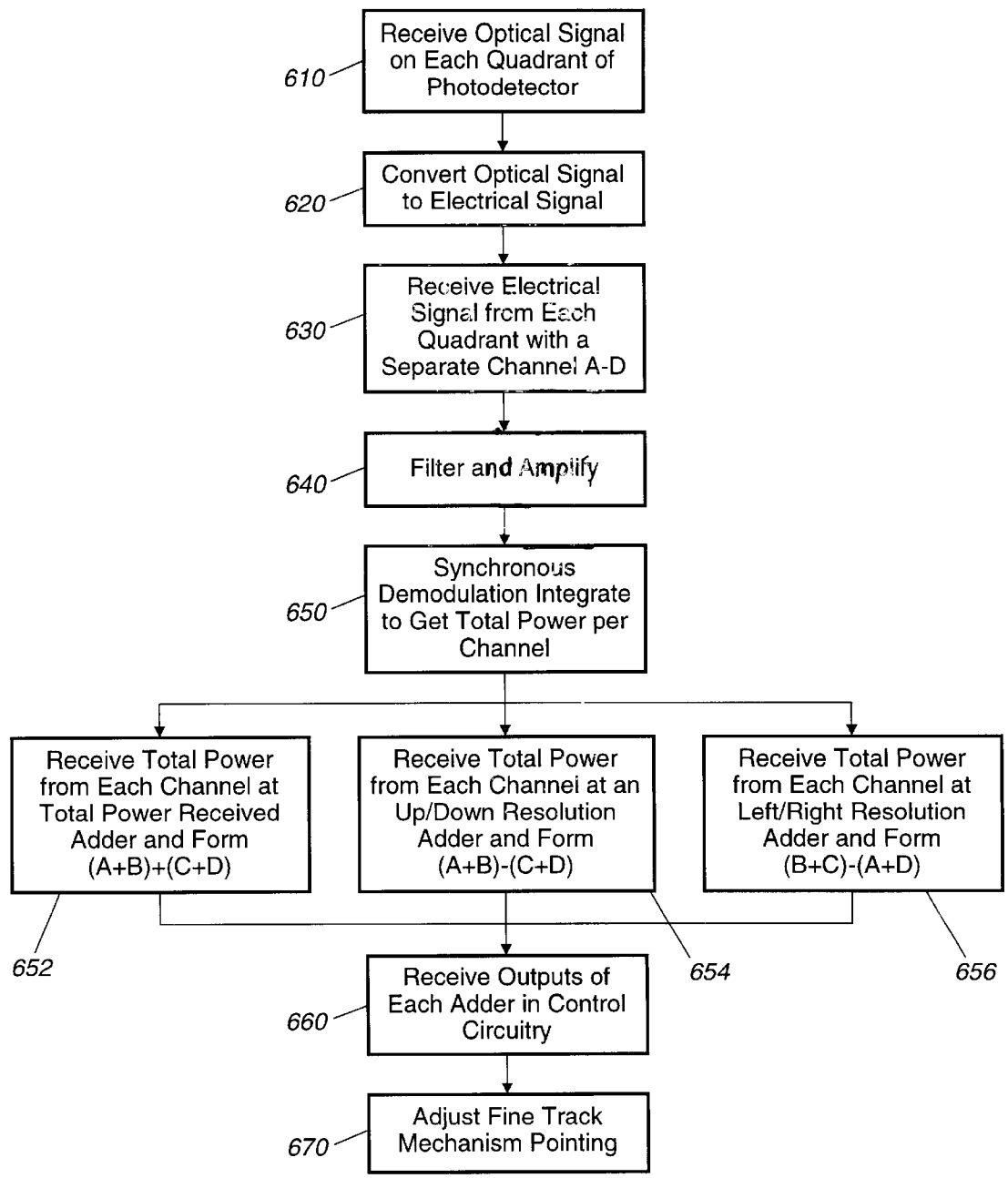
FIG. 6 is a flowchart illustrating the tracking system of the present invention.

FIG. 6 illustrates a flowchart 600 of the present invention. First, at step 610, the optical signal is received on each quadrant A–D 505a–d of the photodetector 505. Then each quadrant's optical signal is converted into a proportional electrical signal at step 620. At step 630, the electrical signal from each quadrant A–D 505a–d is supplied to a separate Channel A–D 511–514. The electrical signal received by each channel is then filtered and amplified at step 640. Next, the electrical signal is synchronously demodulated at step 650. The high and low states of the received electrical signal are separately integrated and then summed to calculate the total power for the channel.

Next, at step 652, the total power for each channel is received by a total power adder which sums the power of all channels to yield the total power received by the photodetector (A+B)+(C+D). At the same time, at step 654, the total power for each channel is received by an up/down resolution adder which sums the power of Channel A 511 and Channel B 512 and subtracts the power of Channel C 513 and Channel D 514 (A+B)–(C+D). Also at the same time, at step 656, the total power for each channel is received by a left/right resolution adder which sums the power of Channel B 512 and Channel C 513 and subtracts the power of Channel A 511 and Channel D 514 (B+C)–(A+D).

Next, at step 660, the outputs of each adder are received by control circuitry. The outputs of the adders are analyzed to determine a pointing correction for the FTM 305. For example, if the output of the up/down resolution adder is negative, more power is being received by the lower half of the sensor (Quadrants C and D) then by the upper half of the sensor (Quadrants A and B) and a pointing correction for the FTM 305 is determined to equalize this power. Conversely, if the output of the up/down resolution adder is positive, less power is being received by the lower half of the sensor (Quadrants C and D) then by the upper half of the sensor (Quadrants A and B) and a pointing correction for the FTM 305 is determined to equalize this power. When the power of the upper half of the sensor equals the power of the lower half of the sensor the output of the up/down resolution sensor is zero and the FTM 305 needs no adjustment. Finally, at step 670, the FTM 305 is adjusted to conform to the pointing correction determined at step 660.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. In a communication terminal for tracking an optical communications beam source transmitting an optical beam, a tracking sensor comprising:
    a multi-channel photodetector, at least some of the channels being arranged so that the channel receiving the optical beam depends at least in part on the location of the optical communications beam source, the photodetector converting at least a portion of the optical beam to a corresponding received signal:
        channel circuitry responsive to the received signal including a synchronous demodulator connected to determine the received power for the channel; and
        at least one adder connected to sum the received power of at least two of said channels.

2. The tracking sensor of claim 1 wherein said multi-channel photodetector, channel circuitry, and at least one adder are contained within a single hermetically sealed packaging including an optical window through which said optical beam passes.

3. The tracking sensor of claim 1 wherein said photodetector comprises an InGaAs photodetector.

4. The tracking sensor of claim 1 wherein said optical beam is received by said photodetector from a communication beam instead of a dedicated beacon.

5. The tracking sensor of claim 1 wherein the optical beam received by the tracking sensor is also received by an acquisition sensor.

6. The tracking sensor of claim 1 wherein the optical beam received by the tracking sensor and a transmitted signal both pass through a same telescope.

7. A optical beam tracking sensor comprising:
    a four-quadrant photodetector;
    four channel circuits, each channel circuit receiving signals from a single quadrant of said photodetector and including a synchronous demodulator for determining the received power for the channel;
    an up/down resolution adder connected to said channel circuits for determining the relative power in the upper two quadrants of the photodetector with respect to the lower two quadrants of the photodetector; and
    a left/right resolution adder connected to said channel circuits for determining the relative power in the left two quadrants of the photodetector with respect to the right two quadrants of the photodetector.

8. The tracking sensor of claim 7 further including a total power received adder.

9. The tracking sensor of claim 7 wherein said photodetector, channel circuits, and adders are contained within a single hermetically sealed packaging including an optical window through which an optical beam passes.

10. The tracking sensor of claim 7 wherein the photodetector comprises an InGaAs photodetector.

11. The tracking sensor of claim 7 wherein said optical beam is received by said photodetector from a communication beam instead of a dedicated beacon.

12. The tracking sensor of claim 7 wherein said optical beam received by the tracking sensor is also received by an acquisition sensor.

13. The tracking sensor of claim 7 wherein said optical beam received by the tracking sensor and a transmitted signal both pass through a same telescope.

14. A tracking system comprising:
    a first terminal transmitting a first optical beam;
    a second terminal including a tracking sensor containing a photodetector responsive to said first optical beam transmitted by said first terminal comprised of four quadrants, each quadrant associated with channel circuitry receiving signals from said quadrant, said channel circuitry including a synchronous demodulator for determining the power received from the quadrant; and
    a fine track mechanism movable to adjust the optical beam incident on said tracking sensor.

15. The tracking system of claim 14 wherein said photodetector comprises an InGaAs photodetector.

16. The tracking system of claim 14 wherein said first optical beam is a communication beam instead of a dedicated beacon.

17. The tracking system of claim 14 wherein said first optical beam received by the tracking sensor is also received by an acquisition sensor.

18. The tracking system of claim 14 wherein said first optical beam received by the tracking sensor passes through the same telescope as a transmitted signal.

19. The tracking system of claim 14 wherein said first and second terminals are one of satellites and ground stations.

20. A method for tracking an optical communications link between a first terminal and a second terminal comprising the steps of:
    transmitting a first optical beam at a first terminal;
    receiving said first optical beam on a quadrant tracking sensor at a second terminal;
    generating for each quadrant a signal indicative of the received power for that quadrant using a synchronous demodulator for each quadrant; and
    reorienting a fine track mechanism at said second terminal in response to said signals.

21. The method of claim 20 wherein;
    said generating step additionally comprises supplying the received power signals to an up/down adder for determining the relative power in the upper two quadrants of the photodetector with respect to the lower two quadrants of the photodetector and supplying the received power signals to a left/right adder for determining the relative power in the left two quadrants of the photodetector with respect to the right two quadrants of the photodetector; and
    said reorienting step additionally including reorienting said second terminal's fine track mechanism in response to the output of said adders.

22. The method of claim 21 wherein;
    said generating step additionally comprises supplying the received power signals to a total power received adder; and said reorienting step additionally includes reorienting said second terminal's fine track mechanism in response to the output of said adders.

23. The method of claim 20 wherein said receiving step additionally comprises receiving said first optical beam on a tracking sensor comprised of an InGaAs photodetector.

24. The method of claim 20 wherein said receiving step additionally comprises receiving an optical beam from a communication beam instead of a dedicated beacon.

25. The method of claim 20 additionally comprising receiving said first optical beam on an acquisition sensor at said second terminal.

26. The method of claim 20 wherein said wherein said receiving step additionally comprises receiving said first optical beam and transmitting a second optical beam through the same telescope at said second terminal.

27. The method of claim 20 wherein said transmitting and receiving steps comprise transmitting and receiving between terminals that are one of a satellite and a ground station.

28. A tracking sensor comprising:
   a multi-channel means for detecting an optical signal, each channel converting at least a portion of a detected optical signal to a corresponding electrical signal;
   means for receiving electrical signals from each of the channels of said means for detecting an optical signal including;
      means for synchronously demodulating said electrical signal; and
      means for determining the power of said electrical signal.

29. The tracking sensor of claim 28 wherein the means for detecting an optical signal comprises an InGaAs photodetector.

30. The tracking sensor of claim 28 wherein said means for detecting an optical signal receives an optical signal from a communication beam instead of a dedicated beacon.

31. The tracking sensor of claim 28 wherein the optical signal received by the tracking sensor is also received by an acquisition sensor.

32. The tracking sensor of claim 28 wherein the optical signal received by the tracking sensor and a transmitted signal both pass through a same telescope.

33. A method for tracking an optical communications link between a first terminal and a second terminal comprising the steps of:
   transmitting a first optical beam at a first terminal;
   receiving said first optical beam on a quadrant tracking sensor at a second terminal;
   generating for each quadrant a signal indicative of the received power for that quadrant; and
   reorienting a fine track mechanism at said second terminal in response to said signals,
wherein said generating step additionally comprises, for each channel, synchronously demodulating the received signal to determine the received power.

* * * * *